US011215779B2

(12) United States Patent
Dong et al.

(10) Patent No.: US 11,215,779 B2
(45) Date of Patent: Jan. 4, 2022

(54) FIBER OPTIC MANAGEMENT DEVICE

(71) Applicant: COMMSCOPE TECHNOLOGIES LLC, Hickory, NC (US)

(72) Inventors: Min Dong, Jiangsu (CN); Hui Li, Shanghai (CN); Guangjun Wang, Shanghai (CN)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/759,071

(22) PCT Filed: Oct. 23, 2018

(86) PCT No.: PCT/US2018/057005
§ 371 (c)(1),
(2) Date: Apr. 24, 2020

(87) PCT Pub. No.: WO2019/083935
PCT Pub. Date: May 2, 2019

(65) Prior Publication Data
US 2021/0181450 A1 Jun. 17, 2021

(30) Foreign Application Priority Data

Oct. 24, 2017 (CN) .......................... 201710996394.4

(51) Int. Cl.
*G02B 6/44* (2006.01)
(52) U.S. Cl.
CPC ................. *G02B 6/4454* (2013.01)
(58) Field of Classification Search
None
See application file for complete search history.

(56) References Cited

U.S. PATENT DOCUMENTS

| 6,243,526 B1 | 6/2001 | Garibay et al. |
| 2002/0051616 A1 | 5/2002 | Battey et al. |

(Continued)

FOREIGN PATENT DOCUMENTS

| CN | 201434919 Y | 3/2010 |
| CN | 104199147 A | 12/2014 |

(Continued)

OTHER PUBLICATIONS

International Search Report and Written Opinion of the International Searching Authority for International Patent Application No. PCT/US2018/057005 dated Mar. 19, 2019, 10 pages.

(Continued)

*Primary Examiner* — Rhonda S Peace
(74) *Attorney, Agent, or Firm* — Merchant & Gould P.C.

(57) ABSTRACT

The present disclosure relates to a fiber optic closure which comprises a tray, a fiber optic adapter arranged on the tray, an output fiber optic connector and an input fiber optic connector inserted into both sides of the fiber optic adapter, and a fiber optic management device configured to accommodate an overlength portion of an output fiber optic connected to the output fiber optic connector. The fiber optic management device comprises a closure fixing part and a fiber optic storage which are mutually connected, the closure fixing part being provided for fixing the fiber optic storage into the fiber optic closure and the fiber optic storage being provided for accommodating the overlength portion of the output fiber optic. The present fiber optic management device can individually store the overlength portion of each of the internal optical fibers, thereby preventing the problem of stacking and entanglement of a plurality of internal optical fibers. In addition, the present fiber optic management device can be placed inside the fiber optic closure and (Continued)

no change needs to be made to the internal structure of the existing fiber optic closure.

18 Claims, 7 Drawing Sheets

(56) References Cited

U.S. PATENT DOCUMENTS

| | | |
|---|---|---|
| 2004/0001686 A1 | 1/2004 | Smith et al. |
| 2004/0228598 A1 | 11/2004 | Allen et al. |
| 2011/0116757 A1* | 5/2011 | Vanmeulen ........... G02B 6/4457 385/135 |
| 2012/0237173 A1 | 9/2012 | Alston et al. |
| 2012/0263425 A1 | 10/2012 | Kowalczyk et al. |
| 2015/0234132 A1* | 8/2015 | Guo .................... G02B 6/4452 385/135 |
| 2015/0346449 A1 | 12/2015 | Clatanoff et al. |
| 2016/0004016 A1 | 1/2016 | Zimmel et al. |
| 2017/0371107 A1* | 12/2017 | Rudenick ............... H01R 13/72 |

FOREIGN PATENT DOCUMENTS

| | | |
|---|---|---|
| CN | 104932069 A | 9/2015 |
| WO | 2016/078712 A1 | 5/2016 |

OTHER PUBLICATIONS

Extended European Search Report for European Patent Application No. 18871433.1 dated Jul. 16, 2021, 8 pages.

* cited by examiner

FIBER OPTIC MANAGEMENT DEVICE

CROSS-REFERENCE TO RELATED APPLICATION

This application is a National Stage of PCT/US2018/057005, filed on Oct. 23, 2018, which claims the benefit of Chinese Patent Application No. 201710996394.4, filed on Oct. 24, 2017, the disclosures of which are incorporated herein by reference in their entireties. To the extent appropriate, a claim of priority is made to each of the above disclosed applications.

TECHNICAL FIELD

The present invention generally relates to a fiber optic closure, and more particularly speaking, the present invention relates to a fiber optic management device for a fiber optic closure.

BACKGROUND ART

In a fiber optic cable communication network, a plurality of optical fibers of one fiber optic cable are respectively connected with a plurality of optical fibers of other fiber optic cables in a manner of fiber optic splicing, so as to form the fiber optic cable communication network. A fiber optic closure, as an apparatus for splicing two optical fibers, is widely used in the fiber optic cable communication network. The fiber optic closure finds application in installation environments such as aerial fiber optic cables, pipes and direct embedment, which can protect the fiber optic cables and can guarantee the communication quality in a harsh natural environment.

The fiber optic closure is provided on an internal tray with a fiber optic splicing means which comprises a fiber optic adapter, an input fiber optic connector that connects an input optical fiber and an output fiber optic connector that connects an output optical fiber. The input fiber optic connector and the output fiber optic connector are respectively inserted into the fiber optic adapter from both sides of the fiber optic adapter, so as to realize splicing between the input optical fiber and the output optical fiber. The fiber optic adapter is pivotable with respect to the tray, thereby facilitating plugging of the fiber optic adapter.

Figure 1:
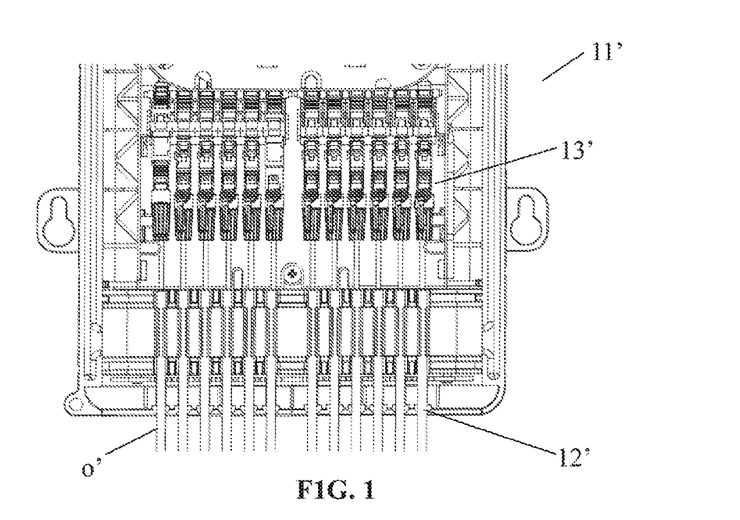
FIG. 1 is a schematic view showing the connection of the output optical fiber to a fiber optic closure when the output optical fiber is a small-diameter optical fiber in the prior art.

As shown in FIG. 1, in the case where the output optical fiber o' is a small-diameter optical fiber, the output optical fiber o' passes through a through-hole 12' on the side wall of a fiber optic closure 11' to be directly connected to an output fiber optic connector 13'. As the output optical fiber o' can go through the through-hole 12' freely, it is unnecessary for the output optical fiber o' to store an overlong length in the fiber optic closure 11'.

Figure 2:
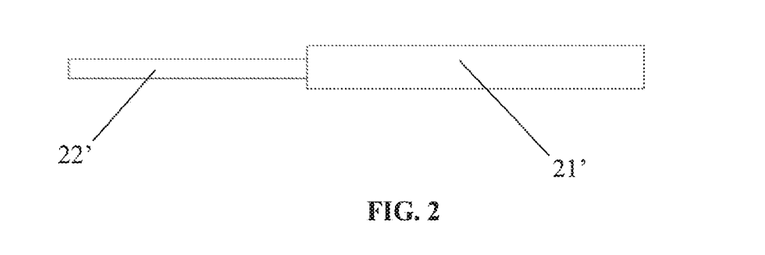
FIG. 2 is a schematic view of the output optical fiber as a hard cable.
Figure 3:
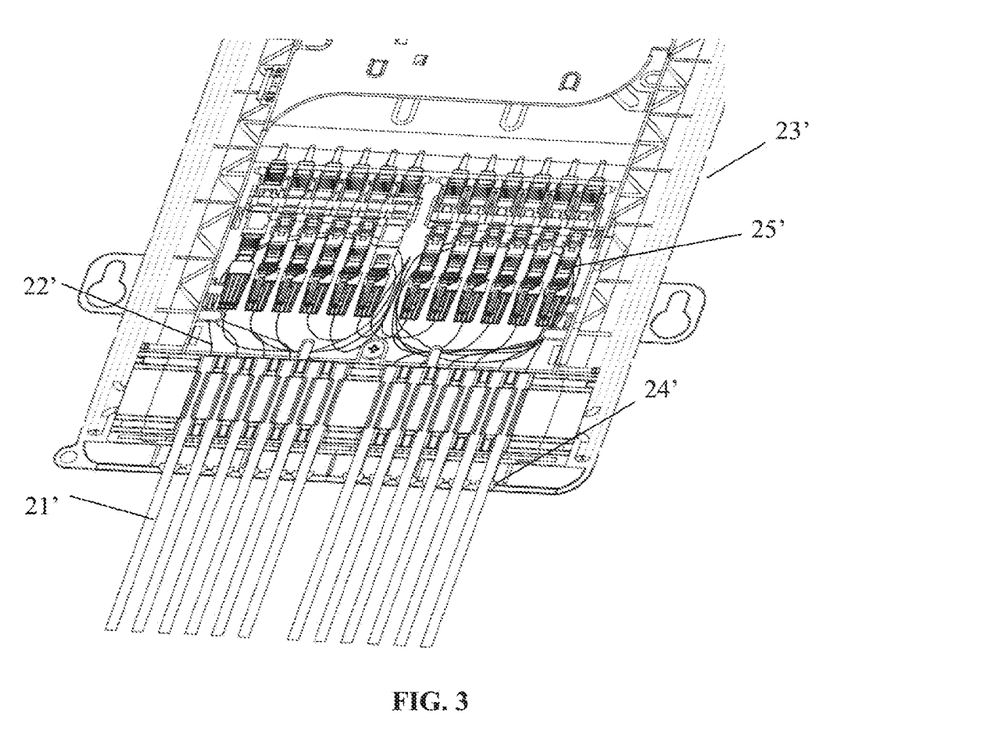
FIG. 3 is a schematic view showing the connection of the output optical fiber to a fiber optic closure when the output optical fiber is a hard cable in the prior art.

In some of the other applications, the output optical fiber o' can be an outdoor hard cable with a harder sheath and a larger diameter. As shown in FIG. 2, in order to connect such a hard cable to the output fiber optic connector, an operator needs to remove a length of a hard sheath 21' and to expose a certain length of an internal optical fiber 22'. As shown in FIG. 3, the operator fixedly engages an end, of which the sheath is not removed, of the hard cable o', into a through-hole 24' on a side wall of a fiber optic closure 23', preventing any movement outside the case of the hard cable from affecting or damaging the exposed internal optical fiber in the case. Subsequently, the operator connects the internal optical fiber 22' which passes through the through-hole 24' to the output fiber optic connector 25'. In field installation, it is impossible for the operator to accurately control the length of the removed sheath 21', which often results in the problem that the exposed optical fiber 22' within the case body is overlong. In this regard, the operator needs to coil the overlong internal optical fibers 22' one by one below the output fiber optic connector 25', so as to form fiber optic coils which are one above another or even entangled. After the installation, when there is a need for management and maintenance of a single optical fiber, the operator has to draw a particular optical fiber from a stack of wound fiber optic coils. The fiber optic material is relatively fragile, and thus the entire drawing process poses significant challenges to the operator, in the aspects of both time and energy.

To this end, it is necessary to design a novel accessory, which can be fitted into the fiber optic closure without changing the existing fiber optic closure structure and can facilitate the individual management and maintenance of each of the internal optical fibers.

SUMMARY OF THE INVENTION

The objective of the present invention is to provide a fiber optic management device for a fiber optic closure, which can individually store the overlength portion of each of the internal optical fibers, thereby preventing the problem of stacking and entanglement of a plurality of internal optical fibers.

The fiber optic management device according to the present invention can be placed inside the fiber optic closure and no change needs to be made to the internal structure of the existing fiber optic closure.

Disclosed herein is a fiber optic closure. The fiber optic closure comprises a tray; a fiber optic adapter arranged on the tray; and an output fiber optic connector and an input fiber optic connector inserted into both sides of the fiber optic adapter. The fiber optic closure further comprises a fiber optic management device configured to accommodate an overlength portion of an output fiber optic connected to the output fiber optic connector. The fiber optic management device comprises a closure fixing part and a fiber optic storage which are mutually connected. The closure fixing part is provided for fixing the fiber optic storage into the fiber optic closure. The fiber optic storage is provided for accommodating the overlength portion of the output fiber optic.

Also disclosed herein is a fiber optic management device for a fiber optic closure. The fiber optic closure comprises therein a tray, a fiber optic adapter arranged on the tray, and an output fiber optic connector and an input fiber optic connector inserted into both sides of the fiber optic adapter. The fiber optic management device is configured to accommodate an overlength portion of an output fiber optic connected to the output fiber optic connector. The fiber optic management device comprises a closure fixing part and a fiber optic storage which are mutually connected. The closure fixing part is provided for fixing the fiber optic storage into the fiber optic closure. The fiber optic storage is provided for accommodating the overlength portion of the output fiber optic.

Further disclosed herein is a method of operating a fiber optic management device for a fiber optic closure as disclosed herein. The method comprises removing a length of a sheath of the output fiber optic and exposing a certain length of an internal fiber optic. The method also comprises fixedly engaging an end, from which the sheath is not removed, of the output fiber optic, into a through-hole on a side wall of the fiber optic closure. The method further comprises connecting the internal fiber optic which passes through the through-hole to the output fiber optic connector. The method additionally comprises placing an outer connector housing and a strain relief jacket of the output fiber optic connector into the closure fixing part of the fiber optic management device. The method further comprises coiling an overlength portion of the internal fiber optic which protrudes from the strain relief jacket in the fiber optic storage. The method additionally comprises inserting the output fiber optic connector which is engaged in the fiber optic storage into the fiber optic adapter.

Additionally disclosed herein is a fiber optic assembly. The fiber optic assembly comprises a fiber optic connector having a fiber optic connected thereto. The fiber optic assembly also comprises a fiber optic management device configured to accommodate an overlength portion of the fiber optic connected to the fiber optic connector and be coupled to an exterior of the fiber optic connector. The fiber optic management device comprises a connector fixing part and a fiber optic storage which are mutually connected. The connector fixing part is provided to be coupled to the exterior of the fiber optic connector. The fiber optic storage is provided for accommodating the overlength portion of the fiber optic.

BRIEF DESCRIPTION OF THE DRAWINGS

A variety of aspects and features of the present invention are described herein with reference to the accompanying drawings, wherein.

DETAILED DESCRIPTION OF THE INVENTION

The present invention will be described as follows with reference to the accompanying drawings, in which certain embodiments of the present invention are shown. However, it is to be understood that the present invention may be embodied in many different forms and should not be construed as limited to the embodiments that are pictured and described herein. Rather, these embodiments are provided so that this disclosure will be thorough and complete, and will fully convey the scope of the invention to those skilled in the art. It will also be appreciated that the embodiments disclosed herein can be combined in any way to provide many additional embodiments.

Unless otherwise defined, all technical and scientific terms that are used in this disclosure have the same meaning as commonly understood by one of ordinary skill in the art to which this invention belongs. The terminology used in the present description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 4:
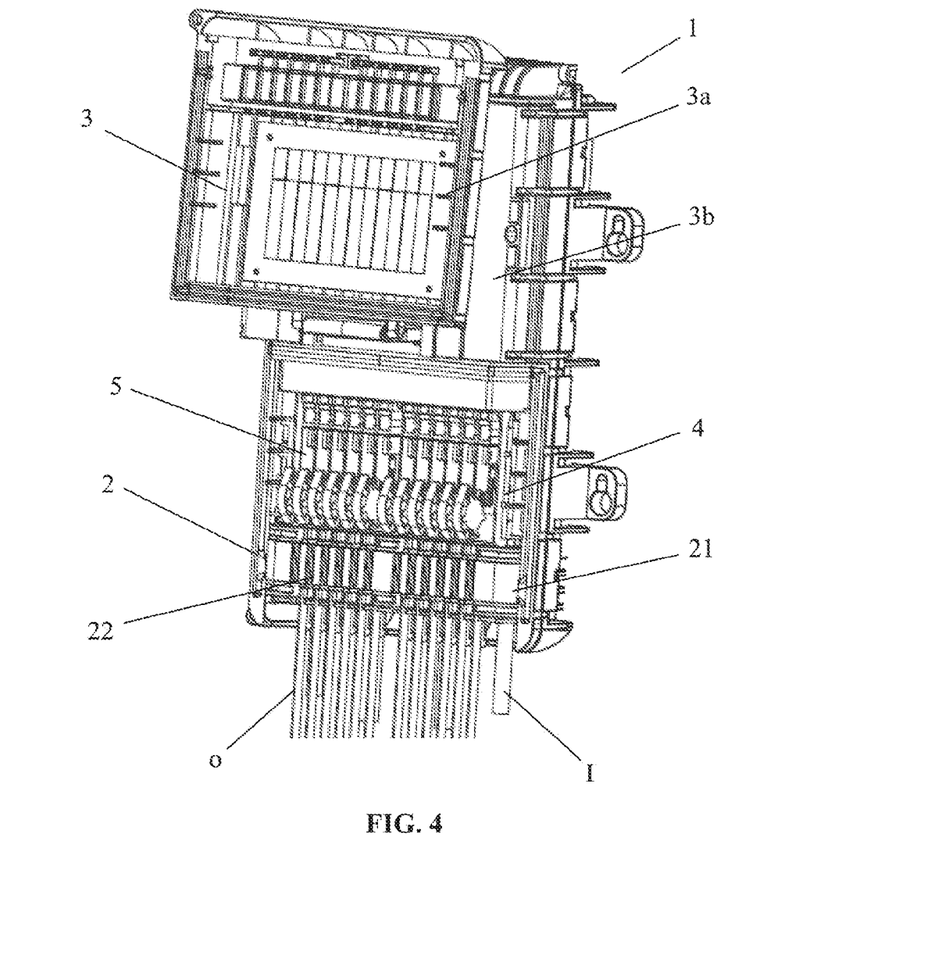
FIG. 4 and FIG. 5 are perspective views of a fiber optic closure according to the present invention.

Referring now to the drawings, FIG. 4 illustrates an example of a fiber optic closure 1. As shown in the figure, the fiber optic closure 1 is used for connecting a plurality of first optical fibers of a first input fiber optic cable I with second output optical fibers o in a manner of fiber optic splicing, and comprises a case body 2, a top cover 3, and a tray 4 arranged between the case body 2 and the top cover 3. In the following description, the direction along the width of the fiber optic closure is called X-direction or transverse direction, the direction along the length of the fiber optic closure is called Y-direction or longitudinal direction, and the direction along the height of the fiber optic closure is called Z-direction or vertical direction.

The case body 2 is substantially cuboid-shaped, and is provided on the longitudinal rear side wall thereof with an input through-hole 21 for entry of the first fiber optic cable I into the case body 2 and with an output through-hole 22 for entry of the second optical fibers o into the case body 2. The input through-hole 21 is positioned vertically below the output through-hole 22. The bottom surface inside the case body 2 is provided with a fiber optic cable storage for storing the overlength portion of the first fiber optic cable I.

The top cover 3 is pivotably connected, at the longitudinal front side thereof by means of a hinge or a pivot or other pivoting mechanisms, to the case body 2, so as to open or close the case body 2. When the top cover 3 is in an open position, the operator may access the internal space of the case body 2; when the top cover 3 is in a closed position, the top cover 3 is engaged with the case body 2 by a snap fit connection at the left, right and rear sides, so as to close the internal space of the case body 2.

In one embodiment, the top cover 3 may be divided into a first top cover part 3a and a second top cover part 3b. The first top cover part 3a is pivotably connected, at the longitudinal front side thereof by means of a hinge or a pivot or other pivoting mechanisms, to the case body 2, and the second top cover part 3b is pivotably connected, at the longitudinal front side thereof, to the longitudinal rear side of the first top cover part 3a. When only the first top cover part 3a is opened, the operator may access the rear internal space of the case body 2; when both the first top cover part 3a and the second top cover part 3b are opened, the operator may access the entire internal space of the case body 2; when the first top cover part 3a and the second top cover part 3b are both in a closed position, the first top cover part 3a and the second top cover part 3b are engaged with the case body 2 by a snap fit connection, so as to close the internal space of the case body 2.

The tray 4 is pivotably connected to the case body 2 by means of a pivot or a hinge or other mechanisms, and supports a fiber optic splicing means 5 with its bottom plate. The tray 4 is rotatable between a storing position of being stored in the case body 2 and an open position of resting against the open top cover 3, so as to facilitate operations such as fiber optic splicing, management or maintenance at the front face or rear face of the tray 4.

Figure 5:
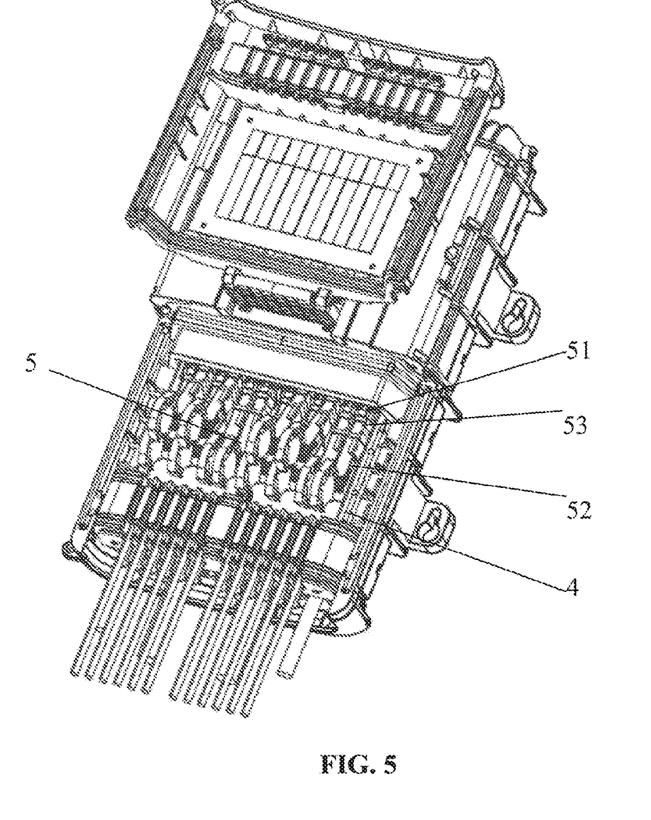

The fiber optic splicing means 5 is arranged on the tray 4 and serves to splice the first optical fibers of the first fiber optic cable I and the second optical fibers o. As shown in FIG. 5, the fiber optic splicing means 5 comprises first fiber optic connectors 51 for the first optical fibers, second fiber optic connectors 52 for the second optical fibers o, and a plurality of fiber optic adapters 53 arranged on the bottom plate of the tray 4. The fiber optic adapters 53 are arranged parallel to one another in the transverse direction, and the first fiber optic connectors 51 and the second fiber optic connectors 52 are respectively inserted into the fiber optic adapters 53 from both longitudinal sides of the fiber optic adapters 53, so as to realize splicing between the first optical fibers and the second optical fibers o. The fiber optic adapters 53 are pivotable between a working position (as shown in FIG. 4), in which the fiber optic adapters 53 are laid flatly on the bottom plate, and a plugging position (as shown in FIG. 5), in which the fiber optic adapters 53 is inclined in relation to the bottom plate, around the transverse pivot thereof with respect to the bottom plate of the tray 4, so as to facilitate plugging of the fiber optic connectors by the operator.

The fiber optic connectors can be categorized into forms such as FC, SC, ST, LC, D4, DIN, MU and MT, according to the structural form of joints. A SC fiber optic connector is usually used for a network device terminal and is a fast connector that can solve the field wiring very well. Taking the SC fiber optic connector as an example, the structures of the second fiber optic connector 52 and of the mating fiber optic adapter 53 in this embodiment are described as below. It should be clear that a fiber optic connector in any other form may further be used as the second fiber optic connector of the present invention. The first fiber optic connector 51 can be any existing fiber optic connectors that can be connected to a cable in a factory.

Figure 6:
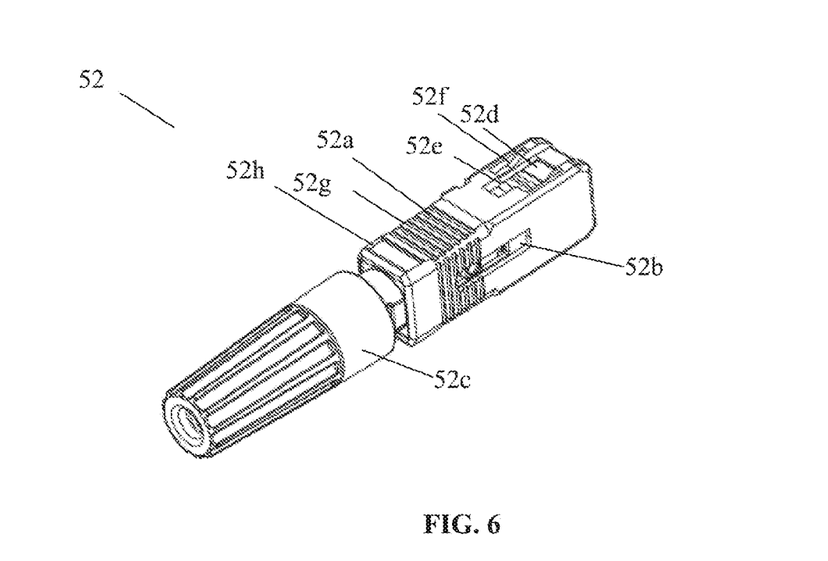
FIG. 6 is a perspective view of a SC fiber optic connector according to the present invention.

As shown in FIG. 6, the second fiber optic connector 52 comprises an outer connector housing 52a, an inner connector housing 52b which is slidably received in the outer connector housing 52a, and a strain relief jacket 52c which is fastened to the inner connector housing 52b. A ferrule is received in the inner connector housing 52b, and the second optical fiber o that is inserted into the inner connector housing 52b is fixedly connected to the ferrule. The inner connector housing 52b has detents 52d at the front sides of the top wall and the bottom wall thereof, the outer connector housing 52a has cutout portions 52e at the front sides of the top wall and the bottom wall thereof, so that the detents 52d are exposed through the cutout portions 52e. The outer connector housing 52a further comprises slopes 52f in the region of the cutout portions 52e, and the slopes 52f are positioned to be adjacent to the detents 52d. The outer connector housing 52a is provided, at the rear sides of the top wall and the bottom wall, with a gripping portion 52g and a boss portion 52h in sequence. The surface of the gripping portion 52g is inclined inwards from the cutout portion 52e towards the boss portion 52h and presents a plurality of ridges, so as to make it easy for the operator to perform a plugging operation by gripping with hands. The boss portion 52h is located at the end of the outer connector housing 52a, and protrudes outwards from the utmost bottom of the surface of the gripping portion 52g till being flush with the top surface of the cutout portion 52e.

Figure 7:
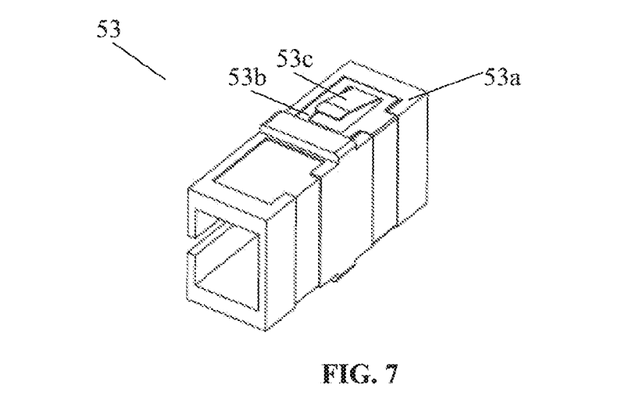
FIG. 7 is a perspective view of a fiber optic adapter according to the present invention.

The side, which receives the second fiber optic connector 52, of the fiber optic adapter 53 will be described herein; it should be understood that the opposite side of the fiber optic adapter 53 is structurally complementary with the first fiber optic connector 51 to receive the first fiber optic connector 51. As shown in FIG. 7, the fiber optic adapter 53 comprises an adapter housing 53a, and the outer connector housing 52a can be slidably received in the adapter housing 53a in the axial direction. The longitudinal middle part of the internal space within the adapter housing 53a is provided with a sleeve which is used for connecting the ferrule of the second fiber optic connector 52 and the corresponding ferrule of the first fiber optic connector 51. The top wall and the bottom wall of the adapter housing 53a are provided with cutout portions 53b, and each cutout portion 53b contains a cantilever clip 53c therein. When the second fiber optic connector 52 is completely inserted into the fiber optic adapter 53, the cantilever clips 53c is received in the detent 52d, and the slope 52f of the outer connector housing 52a is opposite to the cantilever clip 53c. Thus, when the outer connector housing 52a moves along a direction separating from the inner connector housing 52b, the slope 52f is engaged with the cantilever clip 53c, so as to move the cantilever clip 53c outwards for releasing the cantilever clip 53c from the detent 52d, thereby separating the second fiber optic connector 52 from the fiber optic adapter 53.

Figure 8A:
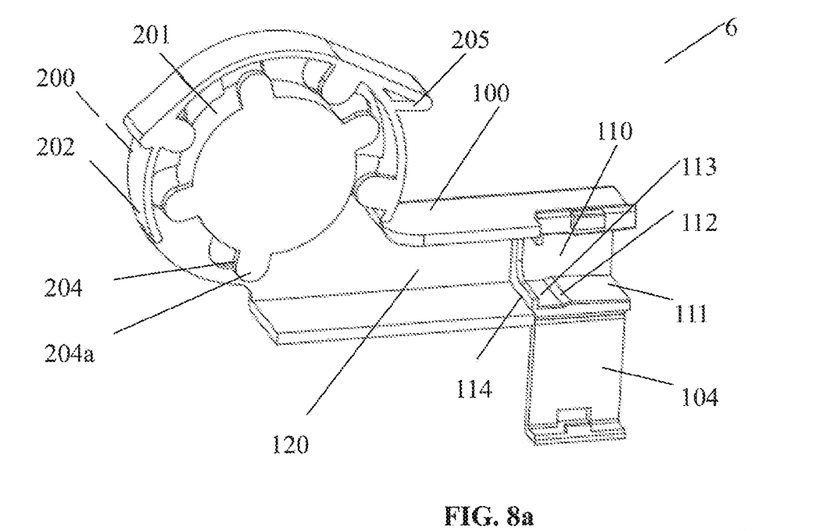
FIG. 8a and FIG. 8b are perspective views of a fiber optic management device according to the first embodiment of the present invention.
Figure 8B:
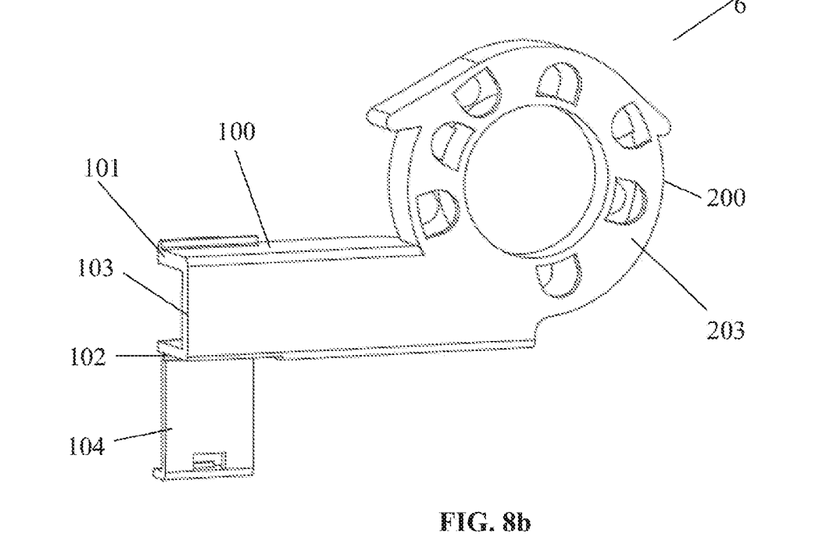

Referring to FIG. 4 and FIG. 5, the end, of which the sheath is not removed, of the second optical fiber o, is fixedly engaged into the output through-hole 22 on a side wall of the fiber optic closure 1, and the overlength portion of the second optical fiber o in the case body 2 is stored by a fiber optic management device 6 according to the first embodiment of the present invention. As shown in FIGS. 8a and 8b, the fiber optic management device 6 comprises a closure fixing part 100 and a fiber optic storage 200 which are mutually connected. The closure fixing part 100 has an outer profile that is substantially rectangular, and is removably fixed to the fiber optic closure 1, in particular to the second fiber optic connector 52 in the case body 2 of the fiber optic closure 1, so it can be also referred to as the connector fixing part. The fiber optic storage 200 has an outer profile that is substantially circular, and is used for coiling and storing the overlength portion of the second optical fiber o. The closure fixing part 100 and the fiber optic storage 200 may be integrally formed from PC, PC/ABS, ABS, PA, PP or other suitable materials.

As shown in the figures, the closure fixing part 100 has a cross section that is substantially channel-shaped, and comprises a top wall 101 and a bottom wall 102 which are parallel to one another and a side wall 103 which is perpendicular to the top wall 101 and the bottom wall 102. The closure fixing part 100 comprises, in the axial direction, an outer connector housing engaging part 110 and a strain relief jacket accommodating part 120. The length of the closure fixing part 100, calculated along the longitudinal central axis, is in the range between 30 mm and 50 mm or between 35 mm and 45 mm, or is 40 mm.

The outer connector housing engaging part 110 is used for removably engaging the portion, which is positioned outside the adapter housing 53a, of the outer connector housing 52a. In one embodiment, the outer connector housing engaging part 110 is used for removably engaging the gripping portion 52g and the boss portion 52h of the outer connector housing 52a.

Figure 9:
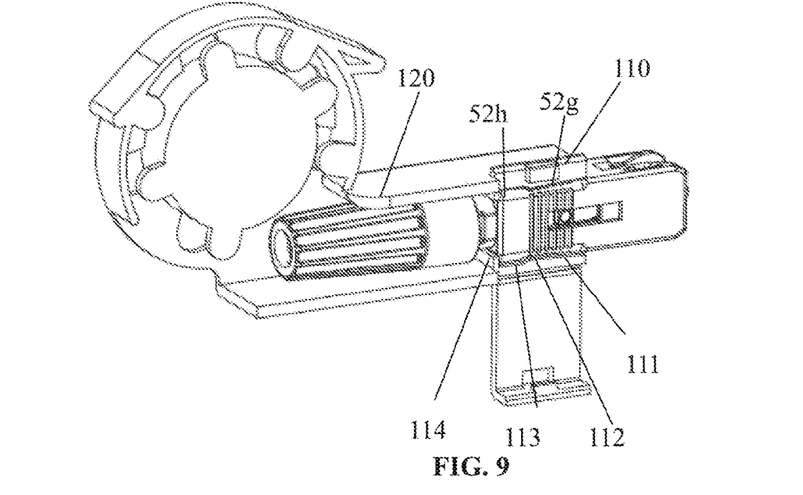
FIG. 9 is a perspective view of a fiber optic management device according to the first embodiment of the present invention, wherein the fiber optic management device is installed in the SC fiber optic connector.

As shown in FIGS. 8a and 9, the inner surfaces of the top wall 101 and the bottom wall 102 of the outer connector housing engaging part 110 are provided axially in sequence with an inwardly inclined slope 111, a first projection 112, a recess 113 and a second projection 114. When the gripping portion 52g and the boss portion 52h are engaged in the outer connector housing engaging part 110, the slope 111 and the slope surface of the gripping portion 52g are brought into close contact, and the outer profile surfaces of the first projection 112, the recess 113, the second projection 114 and the boss portion 52h are brought into close contact, and thereby the gripping portion 52g and the boss portion 52h are tightly engaged in the outer connector housing engaging part 110, and the first projection 112 and the second projection 114 may prevent the longitudinal movement of the boss portion 52h and the outer connector housing 52a relative to the fiber optic management device 6. In one embodiment, the outer connector housing engaging part 110 is further provided at an opening with a closure plate 104 which is integrally formed therewith, the closure plate 104 being opposite to the side wall 103, wherein one end thereof is pivotally connected to one of the top wall 101 and the bottom wall 102, while the other end is a free end and may be locked to the other one of the top wall 101 and the bottom wall 102 by means of a snap fit connection or the like, so that the outer connector housing 52a is closed in the space defined by the top wall 101, the bottom wall 102, the side wall 103 and the closure plate 104, so as to prevent the transverse and vertical movements of the outer connector housing 52a relative to the fiber optic management device 6.

The strain relief jacket accommodating part 120 is used for accommodating the strain relief jacket 52c of the second fiber optic connector 52 and is arranged between the outer connector housing engaging part 110 and the fiber optic storage 200. The length of the strain relief jacket accommodating part 120 is essentially equal to or greater than the length of the exposed portion of the strain relief jacket 52c from the outer connector housing 52a.

Referring still to FIGS. 8a and 8b, the fiber optic storage 200 comprises a side wall 203 which is flush with the side wall 103 of the closure fixing part 100, and an inner circumferential wall 201 and an outer circumferential wall 202 which are concentric and cylindrical, protruding transversely from the side wall 203, and the overlength portion of the second optical fiber o may be coiled in the space defined by the side wall 203 and the inner and outer circumferential walls 201 and 202. In another embodiment, the cylindrical inner circumferential wall 201 and outer circumferential wall 202 may be non-concentric. The diameter of the cylindrical inner circumferential wall 201 of the fiber optic storage 200 is in the range between 10 mm and 40 mm or between 25 mm and 35 mm, or is 30 mm. The central longitudinal axis of the closure fixing part 100 is substantially tangent to the central arc between the cylindrical inner circumferential wall 201 and outer circumferential wall 202, so as to avoid the second optical fiber o from over bending in the fiber management device 6.

It should be understood that the inner and outer circumferential walls 201 and 202 of the fiber optic storage 200 may be in any other suitable shape, for example substantially oblong, substantially elliptical, or substantially polygonal, etc., so long as over bending of the optical fiber does not occur.

The fiber optic storage 200 further comprises a stopping means 204 which prevents disengagement of the coiled portion of the second optical fiber o from the fiber optic storage 200. In one embodiment, the stopping means 204 is integrally formed with the inner and outer circumferential walls 201, 202 and the side wall 203, and comprises a plurality of shielding plates 204a. The shielding plates 204a are interlacedly arranged at end portions of the inner circumferential wall 201 and the outer circumferential wall 202. The shielding plates 204a on the inner circumferential wall 201 protrude towards the direction of the outer circumferential wall 202 and are spaced apart from the outer circumferential wall 202, and the shielding plates 204a on the outer circumferential wall 202 protrude towards the direction of the inner circumferential wall 201 and are spaced apart from the inner circumferential wall 201, so that the operator can fit the second optical fiber o into the space between the inner and outer circumferential walls 201 and 202 through the gap between the shielding plates 204a and the inner and outer circumferential walls. In another embodiment, the stopping means is separately formed from the inner and outer circumferential walls 201, 202 and the side wall 203, and comprises a cylindrical base and shielding plates extending outwardly from the base. The outer profile of the base is complementary to the inner profile of the inner circumferential wall and can be engaged within the inner circumferential wall.

In one embodiment, the fiber optic storage 200 may comprise a handle 205 provided on the outer circumferential wall 202. In the case where the fiber optic management device 6 is engaged with the second fiber optic connector 52, the operator can plug the second fiber optic connector 52 into and out of the fiber optic adapter 53 conveniently with the help of the handle 205.

In the fiber optic splicing operation, the operator opens the top cover 3 and the tray 4 of the fiber optic closure 1, inserts the first fiber optic cable I into the case body 2 through the input through-hole 21, coils the overlength portion of the first fiber optic cable I in the fiber optic storage at the bottom of the case body 2, and introduces the first fiber optic cable I above the tray 4. Subsequently, the operator inserts a plurality of the first optical fibers of the first fiber optic cable I into the fiber optic adapters 53 of the fiber optic splicing means 5 through the first fiber optic connectors 51. The operator removes a length of the sheath of the second optical fiber o to expose a certain length of the internal optical fiber, and fixedly engages an end, of which the sheath is not removed, of the second optical fiber o, into the through-hole 22 of the fiber optic closure 1. Subsequently, the operator connects the internal optical fiber which passes through the through-hole 22 to the second fiber optic connector 52, and places the outer connector housing 52a and the strain relief jacket 52c of the second fiber optic connector 52 into the casing fixing part 100 of the fiber optic management device 6 and closes the closure plate 104. The operator coils the overlength portion of the internal optical fiber which protrudes from the strain relief jacket 52c in the fiber optic storage 200. Thereafter, the operator inserts the second fiber optic connector 52 which is engaged in the fiber optic management device 6 into the fiber optic adapter 53, so as to complete the fiber optic splicing.

Figure 10A:
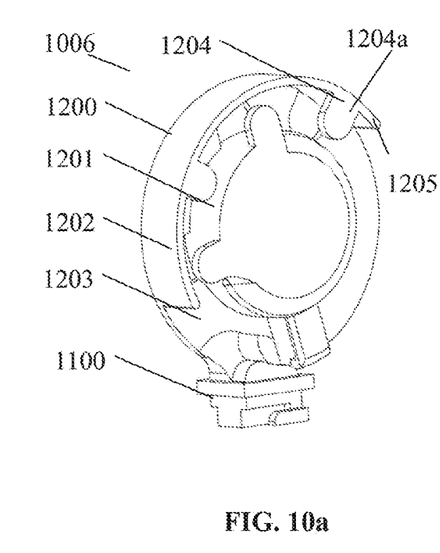
FIG. 10a and FIG. 10b are perspective and front views of a fiber optic management device according to the second embodiment of the present invention.
Figure 10B:
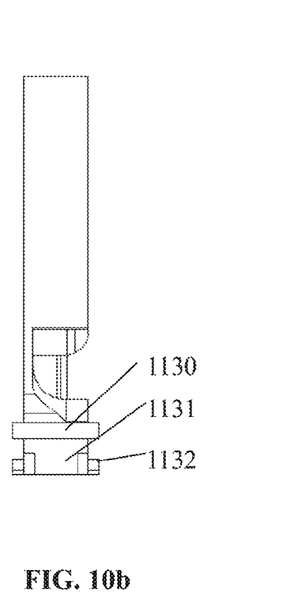

A fiber optic management device 1006 according to the second embodiment of the present invention will be described below with reference to FIGS. 10a and 10b. The fiber optic management device 1006 will represent the same or similar structure by adding 1000 to the reference sign in the fiber optic management device 6. As shown in FIGS. 10a and 10b, the fiber optic management device 1006 comprises a closure fixing part 1100 and a fiber optic storage 1200.

The structure of the fiber optic storage 1200 is the same as that of the fiber optic storage 200, and comprises a side wall 1203 and an inner circumferential wall 1201 and an outer circumferential wall 1202 which are concentric and cylindrical, protruding transversely from the side wall 1203, and the overlength portion of the second optical fiber o may be coiled in the space defined by the side wall 1203 and the inner and outer circumferential walls 1201 and 1202.

The fiber optic storage 1200 further comprises a stopping means 1204 which prevents disengagement of the coiled portion of the second optical fiber o from the fiber optic storage 1200. The stopping means 204 is integrally formed with the inner and outer circumferential walls 1201, 1202 and the side wall 1203, and comprises a plurality of shielding plates 1204a. The shielding plates 1204a are interlacedly arranged at end portions of the inner circumferential wall 1201 and the outer circumferential wall 1202. The shielding plates 1204a on the inner circumferential wall 1201 protrude towards the direction of the outer circumferential wall 1202 and are spaced apart from the outer circumferential wall 1202, and the shielding plates 1204a on the outer circumferential wall 1202 protrude towards the direction of the inner circumferential wall 1201 and are spaced apart from the inner circumferential wall 1201. The fiber optic storage 1200 may further comprise a handle 1205 provided on the outer circumferential wall 1202. In the case where the fiber optic management device 1006 is engaged with the second fiber optic connector 52, the operator can plug the second fiber optic connector 52 into and out of the fiber optic adapter 53 conveniently with the help of the handle 1205.

The closure fixing part 1100 is arranged on the outer circumferential wall 1202 of the fiber optic storage 1200, and comprises a tray engaging part 1130 which protrudes outwards from the outer surface of the outer circumferential wall 1202. The tray engaging part 1130 comprises an engaging part body 1131 and a protruding portion 1132 which protrudes transversely from the lower part of the engaging part body 1131. The protruding portion 1132 can be engaged into a groove of the tray 4 surface, so as to fix the fiber optic management device 1006 to the fiber optic closure 1. The operation steps of the fiber optic management device 1006 are essentially similar to those of the fiber optic management device 6, except that the closure fixing part 1100 of the fiber optic management device 1006 is fixed to the tray 4, while the closure fixing part 100 of the fiber optic management device 6 is fixed to the second fiber optic connector 52.

It should be pointed out that the fiber optic management device of the present invention not only can be used for managing the overlong fiber optic portion within the fiber optic closure, but also can be used for the overlong fiber optic portion of other compact fiber optic cabinets.

The foregoing is illustrative of the present invention and is not to be construed as limiting thereof. Although exemplary embodiments of this invention have been described, those skilled in the art should readily appreciate that many variations and modifications are possible in the exemplary embodiments without materially departing from the novel teachings and advantages of this invention. Accordingly, all such variations and modifications are intended to be included within the scope of this invention as defined in the claims. The invention is defined by the following claims, with equivalents of the claims to be included therein.

What is claimed is:

1. A fiber optic closure, comprising:
a tray;
a fiber optic adapter arranged on the tray;
an output fiber optic connector and an input fiber optic connector inserted into both sides of the fiber optic adapter;
a fiber optic management device configured to accommodate an overlength portion of an output fiber optic connected to the output fiber optic connector, comprising a closure fixing part and a fiber optic storage which are mutually connected, the closure fixing part being provided for fixing the fiber optic storage into the fiber optic closure and the fiber optic storage being provided for accommodating the overlength portion of the output fiber optic; the closure fixing part including an outer connector housing engaging part; and
a closure plate provided at an opening of the outer connector housing engaging part so that an outer connector housing of the output fiber optic connector is closable in the space defined by the outer connector housing engaging part and the closure plate.

2. A fiber optic management device for a fiber optic closure, the fiber optic closure comprising therein a tray, a fiber optic adapter arranged on the tray, and an output fiber optic connector and an input fiber optic connector inserted into both sides of the fiber optic adapter, wherein the output fiber optic connector comprises an outer connector housing;
wherein the fiber optic management device is configured to accommodate an overlength portion of an output fiber optic connected to the output fiber optic connector, and the fiber optic management device comprises a closure fixing part and a fiber optic storage which are mutually connected, the closure fixing part being provided for fixing the fiber optic storage into the fiber optic closure and the fiber optic storage being provided for accommodating the overlength portion of the output fiber optic, the closure fixing part including axially an outer connector housing engaging part for removably engaging the outer connector housing; and
a closure plate provided at an opening of the outer connector housing engaging part such that the outer connector housing is closable in the space defined by the outer connector housing engaging part and the closure plate.

3. The fiber optic management device of claim 2, wherein the fiber optic storage comprises an inner circumferential wall, an outer circumferential wall surrounding the inner circumferential wall, and a side wall connecting the inner circumferential wall and the outer circumferential wall, and the overlength portion of the output fiber optic can be coiled within the space defined by the inner circumferential wall, the outer circumferential wall and the side wall.

4. The fiber optic management device of claim 3, wherein the fiber optic storage comprises a handle provided on the outer circumferential wall.

5. The fiber optic management device of claim 3, wherein the fiber optic storage comprises a stopping means which prevents disengagement of the overlength portion of the output fiber optic from the fiber optic storage.

6. The fiber optic management device of claim 5, wherein the stopping means comprises shielding plates and a base, the outer profile of which base is complementary to the inner profile of the inner circumferential wall and can be fitted into the inner circumferential wall, the shielding plates protruding outwards from the base so as to shield the space between the inner circumferential wall and the outer circumferential wall.

7. The fiber optic management device of claim 2, wherein the output fiber optic connector comprises an inner connector housing which is slidably received in the outer connector housing, and a strain relief jacket which is fastened to the inner connector housing, and the closure fixing part is removably fastened to the output fiber optic connector.

8. The fiber optic management device of claim 7, wherein the length of the closure fixing part, calculated along a longitudinal central axis, is in the range between 30 mm and 50 mm or between 35 mm and 45 mm, or is 40 mm.

9. The fiber optic management device of claim 7, wherein the closure fixing part comprises a strain relief jacket accommodating part for accommodating the strain relief jacket.

10. The fiber optic management device of claim 9, wherein the outer connector housing engaging part removably receives and fixes a portion, which is positioned outside the fiber optic adapter, of the outer connector housing, so that the outer connector housing of the output fiber optic connector and the fiber optic management device are slidable with respect to the inner connector housing of the output fiber optic connector.

11. A fiber optic assembly comprising:
a fiber optic connector having a fiber optic connected thereto, wherein the fiber optic connector comprises an outer connector housing;
a fiber optic management device configured to accommodate an overlength portion of the fiber optic connected to the fiber optic connector and be coupled to an exterior of the fiber optic connector, wherein the fiber optic management device comprises a connector fixing part and a fiber optic storage which are mutually connected, the connector fixing part being provided to be coupled to the exterior of the fiber optic connector and the fiber optic storage being provided for accommodating the overlength portion of the fiber optic, and wherein the connector fixing part comprises axially an outer connector housing engaging part for removably engaging the outer connector housing; and
a closure plate provided at an opening of the outer connector housing engaging part, so that the outer connector housing is closable in the space defined by the outer connector housing engaging part and the closure plate.

12. The fiber optic assembly of claim 11, wherein the fiber optic connector comprises an inner connector housing which is slidably received in the outer connector housing, and a strain relief jacket which is fastened to the inner connector housing, and the connector fixing part is removably fastened to the fiber optic connector.

13. The fiber optic assembly of claim 12, wherein the connector fixing part comprises a strain relief jacket accommodating part for accommodating the strain relief jacket.

14. The fiber optic assembly of claim 13, wherein the outer connector housing engaging part removably receives and fixes a portion of the outer connector housing, so that the outer connector housing of the fiber optic connector and the fiber optic management device are slidable together with respect to the inner connector housing of the fiber optic connector.

15. The fiber optic assembly of claim 13 wherein a cross section of the connector fixing part is substantially channel-shaped.

16. The fiber optic assembly of claim 13, wherein the inner surfaces of a top wall and a bottom wall of the outer connector housing engaging part are provided axially in sequence with an inwardly inclined slope, a first projection, a recess, and a second projection, and when the connector fixing part is removably fastened to the fiber optic connector, the slope, the first projection, the recess, and the second projection are brought into close contact with an outer profile surface of the portion, which is positioned outside the fiber optic adapter, of the outer connector housing.

17. The fiber optic assembly of claim 11, wherein the length of the connector fixing part, calculated along a longitudinal central axis, is in the range between 30 mm and 50 mm or between 35 mm and 45 mm, or is 40 mm.

18. A method of operating a fiber optic management device for a fiber optic closure of claim 2, comprising:
removing a length of a sheath of the output fiber optic and exposing a certain length of an internal fiber optic;
fixedly engaging an end, from which the sheath is not removed, of the output fiber optic, into a through-hole on a side wall of the fiber optic closure;
connecting the internal fiber optic which passes through the through-hole to the output fiber optic connector;
placing the outer connector housing and a strain relief jacket of the output fiber optic connector into the closure fixing part of the fiber optic management device;
coiling an overlength portion of the internal fiber optic which protrudes from the strain relief jacket in the fiber optic storage; and
inserting the output fiber optic connector which is engaged in the fiber optic storage into the fiber optic adapter.

* * * * *